Nov. 1, 1949. P. R. BILLEY 2,486,513
DRIVING MEANS FOR CAGE WHEELS AND THE LIKE
Filed July 8, 1946 3 Sheets-Sheet 2
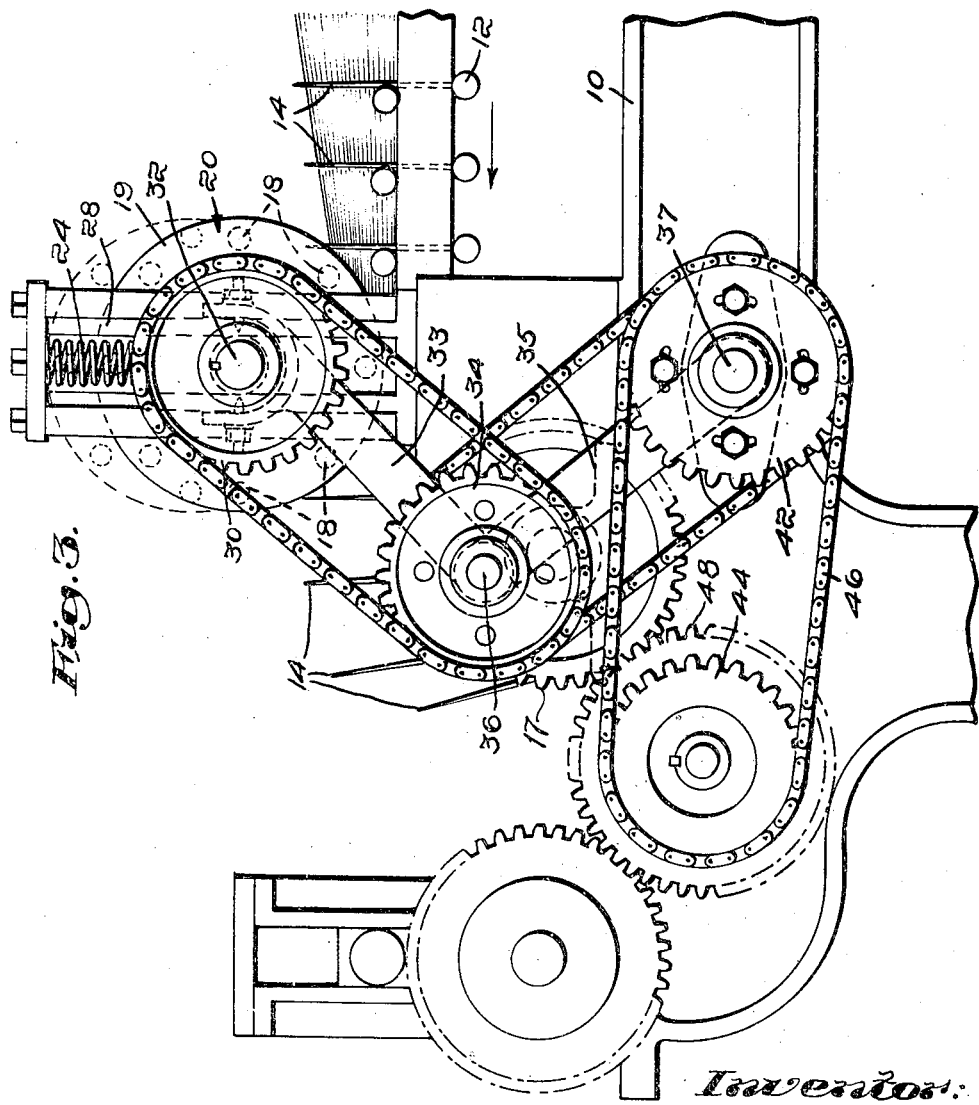

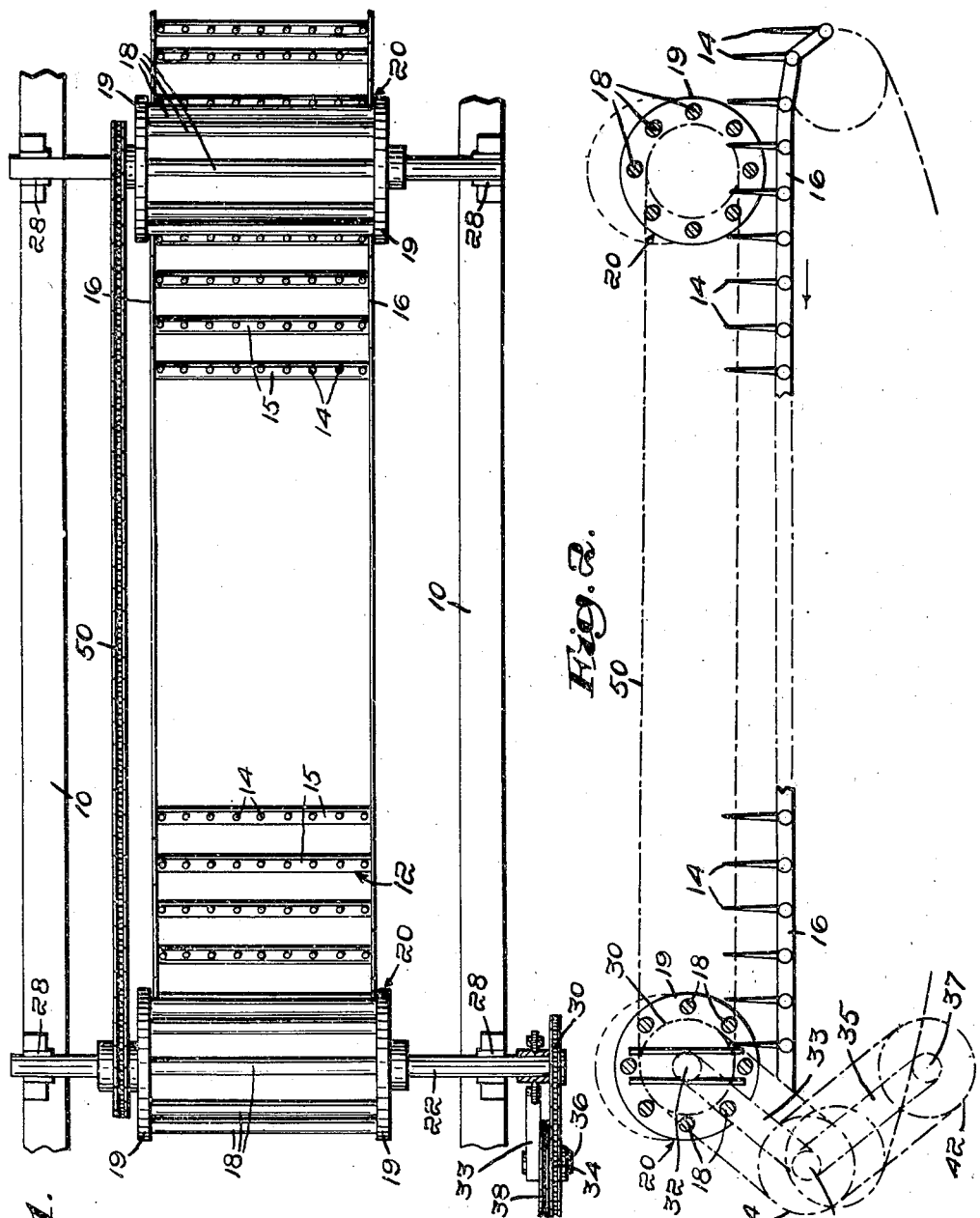

Nov. 1, 1949.   P. R. BILLEY   2,486,513
DRIVING MEANS FOR CAGE WHEELS AND THE LIKE
Filed July 8, 1946   3 Sheets-Sheet 3
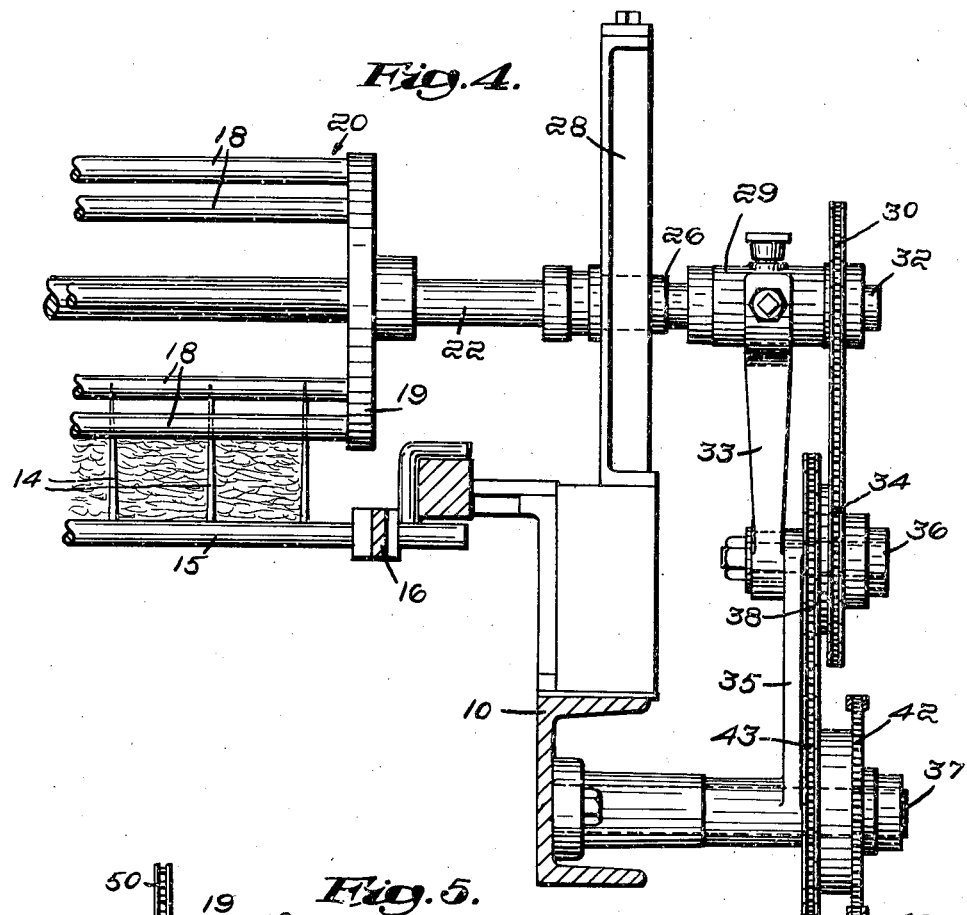
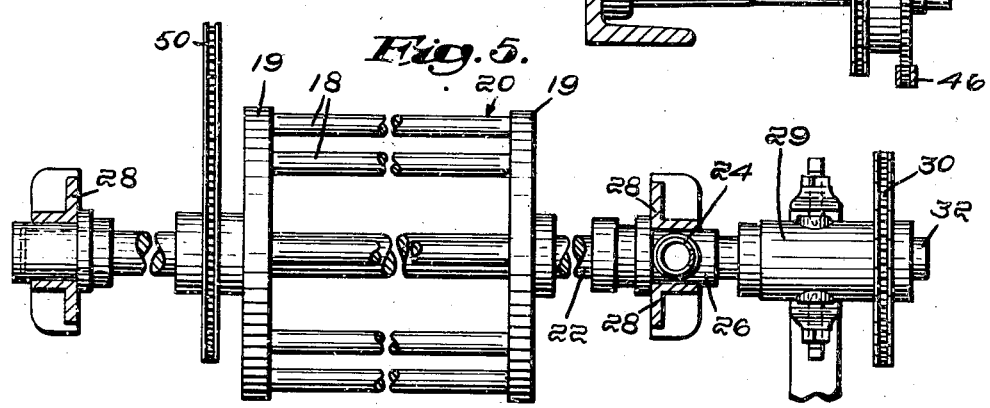
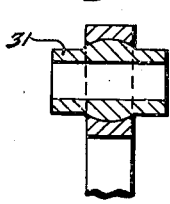 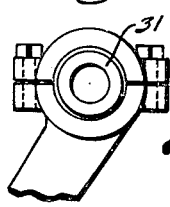

Patented Nov. 1, 1949

2,486,513

UNITED STATES PATENT OFFICE 2,486,513

DRIVING MEANS FOR CAGE WHEELS AND THE LIKE

Peter R. Billey, Plymouth, Mass., assignor to Plymouth Cordage Company, North Plymouth, Mass., a corporation of Massachusetts Application July 8, 1946, Serial No. 682,105

3 Claims. (Cl. 19—127)

This invention relates to driving means for cage wheels and the like.

More particularly it provides mechanism for rotating a cage wheel in synchronism with, and at varying elevations above, the rectilinear horizontal movement of the rows of gill pins that upstand from the conveyer in a machine for drawing and combing fibres that are being prepared for being spun into yarn.

In the instance which is here being used for illustration the pins stand in rows across a flat conveyer. The pins rise four inches or so from the conveyer and their rows are about three inches apart. These dimensions are merely illustrative and do not define limitations of the invention. In this illustrative instance the fibres which are being drawn, individually several feet long, lie lengthwise of the conveyer in a mass of varying inches in depth, with the pins distributed all through the whole area of the conveyer in the layer of fibres. The cage wheel is a cylindrical arrangement of bars spaced apart and rotating in its location to press the mass of fibre down between rows of pins. Thus the rotation of the cage wheel is a sort of intermeshing with the advancing rows of pins. Since the thickness of the layer of fibres is irregular the cage wheel rises and falls, yet must keep its rotation in synchronism with the advancing rows of pins. Of course the conveyer and the cage wheel will be driven from the same source of power, but in every previously known mechanism for rotating the cage wheel, so far as I am aware, the rising and falling of the cage wheel makes its rotation gain or lose, in relation to the pins.

The purpose of the invention is to provide a drive that will make the rotation of the cage wheel in its non-advancing and non-retreating position be always synchronous with the forward movement of the conveyer pins, regardless of the varying elevations of the wheel.

While the invention is here illustrated as it may be applied for driving a cage wheel, its utility extends to the driving of other rotating elements so that the peripheral arc runs in synchronism beside a rectilinearly moving part of the same machine, which may, for example be a conveyer, or a reciprocating table or platen or the like, notwithstanding that the rotary element moves to varying distances from the part having the rectilinear movement.

Also the mechanism can be used for connected rolls which are pressed together to draw fibrous material, or any material of varying thickness. For this purpose, a direct connection of spur gears is commonly used but sometimes the movement required is greater than is practicable with spur gears, in which case the principle of the mechanism herein disclosed can be applied, for keeping the peripheries of the rolls in synchronism notwithstanding their varying distances apart.

If more than one cage wheel is to be used in the same machine, as for example, one where the fibre enters upon the conveyer, and another where the fibre leaves the conveyer, a single cage wheel two-link drive of the present invention may provide drive and synchronism for both wheels. There being a vertical guide for each wheel and a long sprocket chain to connect the two, the rise and fall of either wheel makes only inconsequential difference in the rotative rate determined synchronously for the wheel that is driven by the device of the invention.

Going more into detail, it should be explained that the cage wheel shaft is mounted in bearing blocks which are free to move up and down in stationary vertical guides. Preferably there is a swivel joint in the drive, so that the cage wheel can be up at either end and down at the other. The drive is applied to the shaft at either or both ends of the wheel, as may be desired, through a series of two sprocket chains, with appropriate sprocket wheels that are carried at the ends and middle of a pair of knuckle-jointed links. One of these links has its lower end stationary in the vertical axial plane of the cage wheel, and the other of them has its upper end free to rise and fall with the said vertically-guided bearing block. The pivot between these links at the knuckle is a stud shaft projecting outward to carry the upper sprocket of the lower link, and projecting further to carry the lower sprocket of the upper link, both of these sprockets being keyed to said stud shaft. The lowest sprocket in this series is driven from the same source of power as the conveyer over which the cage wheel rides, with chain or gear synchronous connection.

To understand the action let it be assumed that the bottom sprocket and the conveyer drive continue without change of speed, and that the mechanism is viewed in a direction such that the rotation of the sprockets and cage wheel appears clockwise, also that the links of the drive are at whatever angle to each other that may happen; and assume that the nearer end of the cage wheel is then raised by arrival of a thicker part of the mass of fibre on the conveyer. The action then is that the vertically guided travel upward of the cage wheel raises the top sprocket vertically, and, since the bottom sprocket has a stationary bearing, the lifting of the top sprocket also swings the upper link, and the sprocket chain which it is carrying, to a smaller angle from the vertical, and incidentally is in direction that would rotate that chain, and the top sprocket with it, anti-clockwise about the axis of the top sprocket shaft. This would to some extent nullify the clockwise driving effect of the chain on the top sprocket, and on the cage wheel, producing the evil that is to be avoided, viz, a lag of the cage wheel rotation with respect to the advancing rows of pins on the conveyer.

The preventative provided by the invention is that the simultaneous swing of the lower link of the pair adds a clockwise increment to the knuckle sprocket, by the lifting of its sprocket and drive chain clockwise about the basal sprocket; and the upper sprocket chain, running from the other sprocket wheel that is keyed to the same stud shaft, transmits this increment to the top sprocket, equal to and compensating for the anti-clockwise decrement which the sprocket at the top would simultaneously be experiencing. The increment and the decrement cancel each other.

The accompanying drawings illustrate the invention by showing its embodiment in a machine for drawing and combing long vegetable hard fibre.

In the drawings, which are somewhat diagrammatic:

Figure 1 is a plan of parts of a machine for drawing and combing fibres in which the invention is embodied;

Figure 2 is a side elevation of a part of the same;

Figure 3, on a much larger scale, is a side elevation of the drive mechanism;

Figures 4 and 5 are respectively an end elevation and a plan of the parts of the machine with which the invention is more particularly concerned;

Figures 6 and 7 are end and side elevations of an alternative construction for permitting the cage wheel to tilt while being driven.

The drawing illustrates the invention as it may be embodied in a machine for drawing and combing long vegetable hard fibre, such as sisal, in which machine there is frame 10 that supports the various cooperating elements, including a conveyer 12 having rows of upstanding pins 14. The conveyer is an endless flexible platen of slats 15, drawn by gill chains 16, driven by gear 17, each slat having a row of pins some three or four inches high upstanding in a row across the conveyer. The mass of fibre enters upon the conveyer platen, to be carried along among the pins and meantime to be drawn by faster traveling pins or rolls (not shown) at the delivery end. The entering fibres have to be pressed down between the pins of the successive rows; and this is done by a cage wheel 20 which has bars that extend across the machine above the conveyer, arranged at peripheral intervals around the cage wheel. This is a cylindrical arrangement of bars 18 that reach across the conveyer with annular end supports 19 that are carried on a shaft 22 by which the cage as a whole is rotated. These bars are spaced apart peripherally so that each bar in turn descends between two advancing rows of pins, presses down the fibre there by the weight of the wheel, supplemented by pressure of a spring 24 at each end of its shaft, and rises from between the rows of pins before it is reached by the row of pins that is advancing upon it. Thus the action is a sort of intermeshing of the cage wheel with the conveyer pins, after the manner of a stationary rotating pinion that is intermeshed in a moving rack, except that the successive bars of the wheel must make their entrance and escape without touching the pins.

The cage wheel shaft 22 is mounted so that it is free to have movement in a vertical plane which is fixed, and to be driven rotarily by the top sprocket 30 on stud shaft 32 at whatever elevation it may stand from time to time with its lowest bar or bars resting on the mass of fibre that is on the conveyer among the pins. The travel of the conveyer pins being at a fixed rate, the travel of the cage wheel bars must be synchronous notwithstanding their mobility. This is attained by the mechanism now to be described.

At each end of the cage wheel shaft 22 are bearing blocks 26, free to slide up and down in vertical guides 28, but being pressed down therein by a spring 24. The connection between the part of the shaft that is in the annular end of the wheel and the drive 30, 32, may include a tilting support 29.

In an optional construction, which is preferable in some cases the bearing block embodies in itself a spherically machined joint of ball and socket nature, as seen at 31 in Figures 6 and 7; or a joint may be otherwise swiveled, to enable the cage wheel to tilt. The power drive reaches the wheel shaft 22 through a top sprocket 30 whose stud shaft 32 that runs into the bearing block 26 is journaled in the upper end of the upper link of a series of two knuckle-jointed links 33, 35 which rise from the stud shaft 37 of a basal drive pair of sprockets 42, 43 that are stationarily journaled on the frame of the machine at a location which is below the said top sprocket, and is in the plane of the said vertical guide and of the axis of the cage wheel. There are two sprocket wheels 34, 38 at the knuckle joint, where the shaft 36 is the knuckle pin, to which both of these wheels are keyed. The inner 38 of these has a sprocket chain from the basal drive sprocket 43, and the other 34 on the same stud shaft 36 has a sprocket chain to the top sprocket 30. Power is received by the basal sprocket 42 in any conventional or convenient way, that here shown being from a sprocket 44 by a chain drive 46 to sprocket 42 on the same shaft with the basal sprocket 43. The sprocket 44 rotates with the gear 48, to whose shaft it is keyed. As this meshes with the gear 17 in the drive of the conveyer these basal gears and sprockets represent the speed of the conveyer drive.

The drive with which the invention is concerned is that between the basal sprocket 42 and the top sprocket 30 which is on an outer extension of the shaft 22 of the cage wheel, for turning the cage wheel, permitting that wheel to tilt in either direction and to rise and fall as the uneven masses of the bed of fibre on which it rests lift it or let it down from time to time within the vertical plane of the two guides.

The distinctive feature of the invention which produces synchronism between the cage wheel and the conveyor is that, the basal sprockets 42, 43 and the top sprocket 30 having axes in the same vertical plane with the bearing block 26 and the wheel shaft 22, with the knuckle joint pin 36 and its two sprockets 34, 38 moving toward and from that plane as the top sprocket 30 moves up and down, the increment to cage wheel rotation which would be produced by a swinging of the link 33 toward the vertical plane is nullified by the decrement in speed of the knuckle sprockets and the upper sprocket chain which the simultaneous swinging of the lower link 35 produces, in the sprockets at the knuckle joint, relative to the constant rate at which the basal sprocket is turning.

The long sprocket chain 50 running beside the conveyer to connect between the two cage wheels keeps the distant wheel in sufficiently close synchronism with that cage wheel to which the two-link drive is more directly applied.

Having thus disclosed my invention and described in detail an illustrative embodiment thereof, I claim as new and desire to secure by Letters Patent:

1. In a combing and drawing machine, for fibre, having a horizontal conveyer with pins upstanding in the midst of the fibre, a cage wheel for pressing down the fibre between the pins, and a basal shaft and sprocket connected in synchronism with the conveyor, a driving mechanism for rotating the cage wheel comprising in combination a pair of links knuckle-jointed together, intervening between the basal sprocket and the cage wheel, rising from the basal sprocket shaft, having at their knuckle pin two sprockets keyed on that pin, and having one sprocket at the top of the upper link; a shaft connecting the upper sprocket wheel with the cage wheel; a bearing block for that shaft; and a vertical guide way for this block to rise and fall with the cage wheel; a sprocket chain from the basal sprocket to one of the sprockets at the knuckle; and a sprocket chain from the other sprocket at the knuckle to the top sprocket, whereby the rising and falling cage wheel is rotated in synchronism with the conveyer drive.

2. In a machine having a frame and two moving members mounted thereon in proximity to each other, the first said moving member moving in a fixed path and the second said moving member having a shaft for rotating it and also being movable to varying distances from the said fixed path of the first member, and a basal sprocket wheel for driving the second member, rotating in synchronism with the movement of the first member, and having a shaft journaled at a position which is stationary with respect to the position of the first member, and, in combination with the foregoing, a driving mechansm for the second member comprsing a pair of links knuckle-jointed together, intervening between the basal sprocket and the second member, extending from the basal sprocket shaft toward the shaft of the second member, having at their knuckle pin two sprockets keyed on that pin, and having one sprocket at the free end of the pair of links; the shaft of the free-end sprocket being connected to the shaft of the said second member; a bearing block for that second member's shaft; a guide-way for this block perpendicular to the direction of movement of the first member for the block to move to varying distances from the first member; a sprocket chain from the basal sprocket to one of the sprockets at the knuckle; and a sprocket chain from the other sprocket at the knuckle to the free-end sprocket; whereby the second member is rotated in synchronism with the movement of the first member.

3. The combination in a machine, as in claim 2, further characterized in that between the free-end sprocket and the second member there is a swivel mounting of the shaft of the second member for the tilting of that shaft in the plane of that shaft and the perpendicular guide-way.

PETER R. BILLEY.

REFERENCES CITED

The following references are of record in the file of this patent:

UNITED STATES PATENTS

| Number | Name | Date |
| --- | --- | --- |
| 468,726 | Murphy | Feb. 9, 1892 |
| 608,980 | Good | Aug. 9, 1898 |
| 1,543,984 | Butler | June 30, 1925 |
| 1,744,746 | Brown | Jan. 28, 1930 |
| 2,228,809 | Solanas | Jan. 14, 1941 |

FOREIGN PATENTS

| Number | Country | Date |
| --- | --- | --- |
| 486,716 | Germany | Nov. 23, 1929 |